United States Patent [19]

Mahant-Shetti et al.

[11] Patent Number: 5,367,702
[45] Date of Patent: Nov. 22, 1994

[54] SYSTEM AND METHOD FOR APPROXIMATING NONLINEAR FUNCTIONS

[75] Inventors: Shivaling S. Mahant-Shetti, Richardson; Thomas J. Aton; Jerold A. Seitchik, both of Dallas, all of Tex.

[73] Assignee: Texas Instruments Incorporated, Dallas, Tex.

[21] Appl. No.: 71

[22] Filed: Jan. 4, 1993

[51] Int. Cl.$^5$ ............................................. G06F 15/353
[52] U.S. Cl. ................................. 395/800; 364/937.1; 364/DIG. 2
[58] Field of Search .......................... 395/800; 382/48; 358/136

[56] References Cited

U.S. PATENT DOCUMENTS

| | | | |
|---|---|---|---|
| 3,922,540 | 11/1975 | Lunsford | 364/818 |
| 4,144,543 | 3/1979 | Koga | 358/136 |
| 4,173,017 | 10/1979 | Burlage et al. | 342/162 |
| 4,601,054 | 7/1986 | Watari et al. | 395/2.47 |
| 4,878,190 | 10/1989 | Darley et al. | 364/752 |
| 5,247,587 | 9/1993 | Hasegawa et al. | 382/48 |

OTHER PUBLICATIONS

32 I.B.M. Journal of Research and Development, vol. 27 (1983) Nov., No. 6. Armonk, New York, USA "Replacing Square Roots by Pythagorean Sums", Cleve Moler et al. *Paragraph 3*.

Database WPI Section EI, Week 8323, 21 Sep. 1983 Derwent Publications Ltd., London GB; Class T01, AN 83-733340 & SU-A-962 925 (Protchenko) 30 Sep. 1982 *Abstract*.

Communications of the Association For Computing Machinery; vol. 29, No. 12, Dec. 1986, New York US pp. 1155–1161; J. Bentley "programming pearls Birth Of A Cruncher" *p. 1160, right col., Line 26*.

IEEE Micro; vol. 3, No. 5, Oct. 1983, New York US; pp. 27–31; W. Adams "Magnitude approximations for microprocessor implementation" *p. 28, right col., line 43—p. 29, left col., line 39; figure 5; table 2*.

*Primary Examiner*—Alyssa H. Bowler
*Assistant Examiner*—John Harrity
*Attorney, Agent, or Firm*—John C. Crane; Richard L. Donaldson

[57] ABSTRACT

A system (10) is provided for approximating a nonlinear function. The system (10) comprises first and second multiple generating circuits (12) and (14) for multiplying a first quantity and a second quantity by up to three integer powers of two. First and second function generating circuits (16) and (18) generate first and second functions of the first and the second quantities by combining the multiples generated in first and second multiple generating circuits (12) and (14). First and second approximation generating circuits (20) and (22) generate first and second approximations of the nonlinear function by shifting the output of first and second function generating circuits (16) and (18). Approximation selecting circuit (24) outputs the appropriate approximation generated in first and second approximation generating circuits (20) and (22).

28 Claims, 6 Drawing Sheets

SYSTEM AND METHOD FOR APPROXIMATING NONLINEAR FUNCTIONS

TECHNICAL FIELD OF THE INVENTION

This invention relates in general to the field of data processing systems and more particularly to a system and method for approximating nonlinear functions.

BACKGROUND OF THE INVENTION

The operation of many modern electronic systems requires the repetitive calculation of nonlinear functions. For example, many systems require the comparison of multi-dimensional vectors. In these systems, measured vector quantities are compared with stored vector quantities by calculating the Euclidean distance between the vectors. Many speech recognition systems, for example, operate through comparing vector quantities in this manner.

Prior methods for comparing vector quantities determine the Euclidean distance between the vectors according to the following equation:

$$D = \sqrt{(b_0 - a_0)^2 + (b_1 - a_1)^2 + (b_2 - a_2)^2 + \ldots + (b_n - a_n)^2} \quad (1)$$

Therefore, the distance between vectors $\vec{A}$ and $\vec{B}$ is the square root of the sum of n squares where n is the dimension of the vectors $\vec{A}$ and $\vec{B}$. If the distance between the vectors is zero, then the measured vector matches the stored vector.

In digital signal processing applications, this distance is typically calculated by modifying the equation (1) to read as follows:

$$D = \sqrt{(b_0^2 + b_1^2 + \ldots + b_n^2) + (a_0^2 + a_1^2 + \ldots + a_n^2) - 2(a_0 b_0 + a_1 b_1 + a_2 b_2 + \ldots a_n b_n)} \quad (2)$$

The first two terms under the radical represent the normalized magnitudes of the two vectors $\vec{A}$ and $\vec{B}$. If the components of the vectors $\vec{A}$ and $\vec{B}$ are 8 bits in precision, the squared components will be 16 bits in precision. Therefore, the normalized magnitudes of the vectors $\vec{A}$ and $\vec{B}$, the sum of the squared components, will be on the order of 24 bits in precision for a 256 component vector. The distance is calculated by multiplying each component of the $\vec{A}$ vector by its corresponding component in the $\vec{B}$ vector, summing these results in an accumulator, and then subtracting two times the accumulated sum from the sum of the squares of the magnitudes of the two vectors. This operation requires repeated multiplication in a multiplier that is at least 8 bit by 8 bit. This is a slow process and, if the vectors are close enough to be considered a match, the calculated distance between the vectors will be on the order of a two or three bit number. However, to calculate this distance, the sum of the multiplications needs to be computed to the same precision as the sum of the squared components, for example 24 bits. Calculating the distance between two similar vectors requires a large multiplier with precision that is not consistent with the precision of the result. In fact, this implementation will be slow and require considerable power.

Therefore, a need has arisen for a method and system of approximating nonlinear functions which quickly calculates a close approximation of the exact function and is realizable in a small area in an integrated semiconductor device.

SUMMARY OF THE INVENTION

In accordance with the present invention, a system and method for approximating nonlinear functions are provided which substantially eliminates or reduces disadvantages and problems associated with prior systems and methods.

More specifically, the present invention provides a method and system which approximates the exact value of nonlinear functions of two variables. A first quantity for the first variable is multiplied by up to three integer powers of two to form a limited number of multiples of the first quantity. A second quantity for the second variable is multiplied by up to three integer powers of two to form a limited number of multiples of the second quantity. First and second linear functions of the first and said second quantities are generated by combining the generated multiples of the first and second quantities. First and second approximations are generated by shifting the first and second functions in shifters. The appropriate approximation for the first and second variables is outputted by the system.

An important technical advantage of the present invention inheres in the fact that it uses adders, subtracters, multiplexers, and shifters to approximate nonlinear functions. The use of these small and fast circuit components increases the speed and reduces the expense in terms of semiconductor area with which nonlinear functions can be calculated. Additionally, the use of small, three or four bit adders and subtracters provides enough precision in the approximation for many modern electronic systems.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
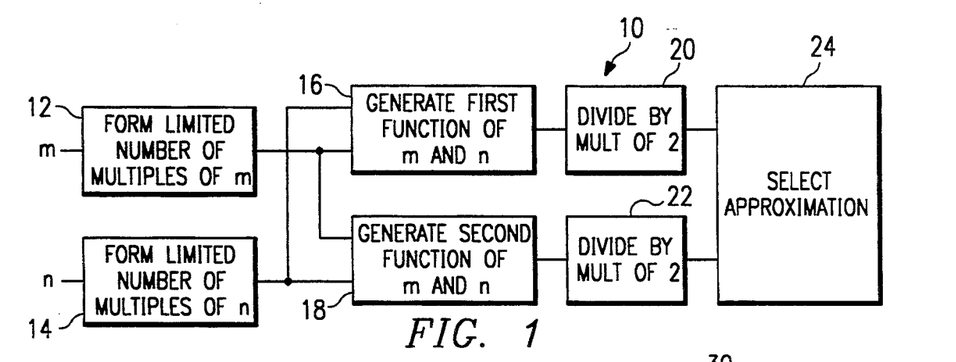
FIG. 1 illustrates a block diagram of a first system for approximating a function according to the teachings of the present invention.

FIG. 1 illustrates a system indicated generally at 10 constructed according to the teachings of the present invention for approximating a nonlinear function. System 10 comprises a first multiple generating circuit 12 and a second multiple generating circuit 14. First multiple generating circuit 12 is coupled to receive an input m. First multiple generating circuit 12 generates a limited number of integer powers of two times m. Second multiple generating circuit 14 forms a limited number of integer powers of two times n. A first function generating circuit 16 is coupled to an output of first and second multiple generating circuits 12 and 14. First function generating circuit 16 generates a predetermined function of m and n. A second function generating circuit 18 is coupled to the output of first and second multiple generating circuits 5, 12 and 14. Second function generating circuit 18 generates a predetermined function of m and m. A first approximation generating circuit 20 is coupled to an output of first function generating circuit 16. A second approximation generating circuit 22 is coupled to an output of second function generating circuit 18. An approximation selecting circuit 24 is coupled to an output of first approximation generating circuit 20 and an output of second approximation generating circuit 22.

In operation, the system 10 approximates a nonlinear function according to a piecewise linear approximation. First multiple generator circuit 12 may comprise, for example, a combination of shifters coupled to generate a limited number of multiples of m. The output of first multiple generator circuit 12 may comprise, for example, m, 2 m and 4 m. Second multiple generator circuit 14 may comprise, for example, a second combination of shifters coupled to generate a limited number of multiples of n. The output of second multiple generator circuit 14 may comprise, for example, n, 2 n, and 4 n.

First function generating circuit 16 may comprise, for example, a combination of adders and subtracters for generating a first function from the multiples of m and n generated in first and second multiple generating circuits 12 and 14. The output of first function generating circuit 16 may comprise, for example, 8 m+n. Second function generating circuit 18 may comprise, for example, a second combination of adders and subtracters for generating a second function from the multiples of m and n generated in first and second multiple generating circuits 12 and 14. The output of second function generator circuit 18 may comprise, for example, 8 m+4 n−m.

First approximation generating circuit 20 may comprise, for example, a shifter for shifting the output of first function generating circuit 16 by 3 bits to the right so as to divide the output of first function generating circuit 16 by 8. The output of first approximation generating circuit 20 may comprise, for example, m+n/8. Second approximation generating circuit 22 may comprise, for example, a shifter for shifting the output of second function generating circuit 18 by 3 bits to the right so as to divide the output of second function generating circuit 18 by 8. The output of second approximation generating circuit 22 may comprise, for example, m+n/2−m/8.

Approximation selecting circuit 24 may comprise, for example, a multiplexer and a multiplexer control circuit. The output of the approximation selecting circuit 24 may comprise, for example, the larger of the outputs of first approximation generating circuit 20 and second approximation generating circuit 22. Alternatively, the output of approximation selecting circuit 24 may comprise the output of first approximation generating circuit 20 if the ratio of n to m is less than a predetermined breakpoint and the output of second approximation generating circuit 22 if the ratio of n to m is greater than the predetermined breakpoint.

Figure 2:
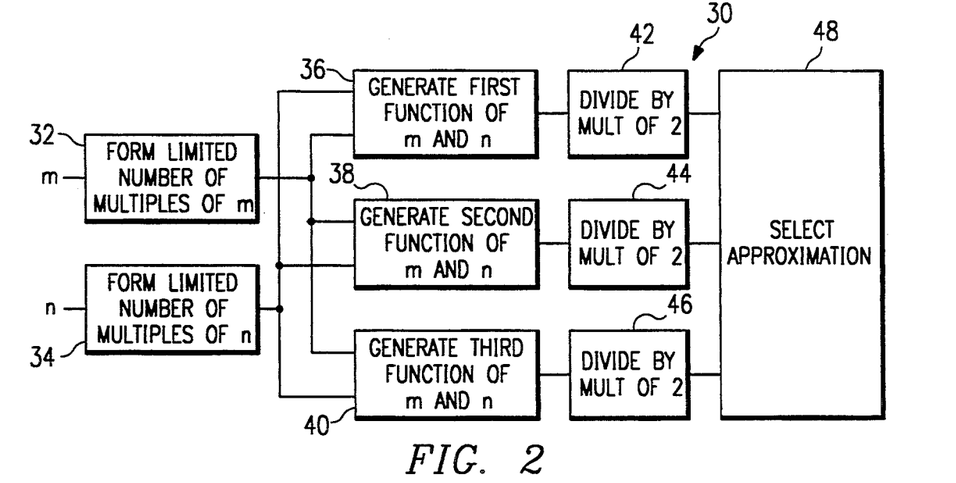
FIG. 2 illustrates a block diagram of a second system for approximating a function according to the teachings of the present invention.

FIG. 2 illustrates a circuit indicated generally at 30 constructed according to the teachings of the present invention for approximating a nonlinear function. Circuit 30 comprises first and second multiple generating circuits 32 and 34. First multiple generating circuit 32 is coupled to receive a quantity m. Second multiple generating circuit 34 is coupled to receive a quantity n. First, second, and third function generating circuits 36, 38, and 40 are coupled to an output of first multiple generating circuit 32 and an output of second multiple generating circuit 34. First approximation generating circuit 42 is coupled to first function generating circuit 36. Second approximation generating circuit 44 is coupled to second function generating circuit 38. Third approximation generating circuit 46 is coupled to third function generating circuit 40. Approximation selection circuit 48 is coupled to first, second, and third approximation generating circuits 42, 44, and 46.

In operation, first multiple generating circuit 32 may comprise, for example, a limited number of shifters. The shifters of first multiple generating circuit 32 multiply the quantity m by various integer powers of 2. Second multiple generating circuit 34 may comprise, for example, a limited number of shifters. The shifters of second multiple generating circuit 34 multiply the quantity n by various integer powers of 2.

First function generating circuit 36 may comprise, for example, a combination of adders and subtracters for generating a first function from the multiples of m and n generated in first and second multiple generating circuits 32 and 34. The output of first function generating circuit 36 may comprise, for example, the function 8 m+4 n−m. Second function generating circuit 38 may comprise, for example, a combination of adders and subtracters for generating a second function from the multiples of m and n generated in first and second multiple generating circuits 32 and 34. The output of second function generating circuit 38 may comprise, for example, the function 8 m+n−m. Third function generating circuit 40 may comprise, for example, a combination of subtracters and adders for generating a third function from the multiples of m and n generated in first and second multiple generating circuits 32 and 34. The output of third function generating circuit 40 may comprise, for example, the function 32 m+20 n−7 m.

First approximation generating circuit 42 may comprise, for example, a shifter for shifting the output of first function generator 36 by 3 bits to the right so as to divide the output of first function generating circuit 36 by 8. Second approximation generating circuit 44 may comprise, for example, a shifter for shifting the output of second function generating circuit 38 by 3 bits to the right, so as to divide the output of second function generating circuit 38 by 8. Third approximation generating circuit 46 may comprise, for example, a shifter for shifting the output of third function generating circuit 40 by 5 bits to the right so as to divide the output of third function generating circuit 40 by 32.

Approximation selecting circuit 48 may comprise, for example, a multiplexer and a multiplexer control circuit. Approximation selecting circuit 48 outputs the appropriate approximation for the input m and n. In one embodiment, approximation selection circuit 48 outputs the larger of the outputs of first, second, and third approximation generating circuits 42, 44, and 46. Alternatively, approximation selecting circuit 48 outputs the appropriate approximation based on a comparison of the ratio of the inputs, n and m, with first and second predetermined breakpoints. If the ratio of n to m is less than the first predetermined breakpoint, approximation selecting circuit 48 outputs the output of the first approximation generating circuit 42. If the ratio of n to m is greater than the first predetermined breakpoint and less than the second predetermined breakpoint, approximation selecting circuit 48 outputs the output of second approximation generating circuit 44. If the ratio of n to m is greater than the second predetermined breakpoint, approximation selecting circuit 48 outputs the output of third approximation generating circuit 46. A third embodiment of approximation selecting circuit 48 is best understood by reference to FIG. 3.

Figure 3:
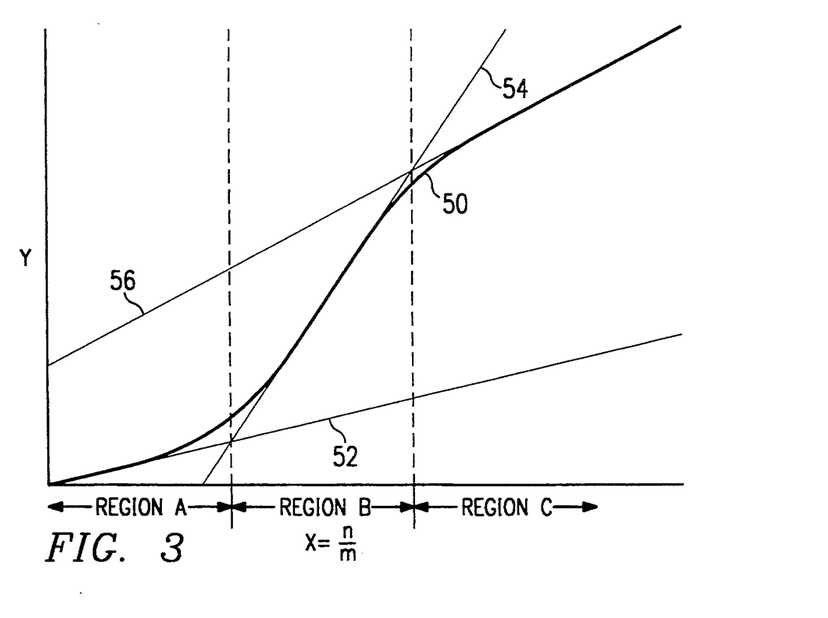
FIG. 3 is a graphical representation of an approximation used by the second system according to the teachings of the present invention.

FIG. 3 is a graphical representation of an approximation that may be used in the second system for approximating a nonlinear function according to the teachings of the present invention. In FIG. 3, a nonlinear function 50 having three regions namely, region A, region B, and region C is illustrated. The X component of FIG. 3 represents the ratio of n/m. The Y component of FIG. 3 represents the value of the nonlinear function 50 and the corresponding value for X. First approximation component 52 corresponds to the output of first approximation generator circuit 42. Second approximation component 54 corresponds to the output of second approximation generating circuit 44. Third approximation component 56 corresponds to the output of third approximation generating circuit 46. In this embodiment, approximation selection circuit 48 outputs first approximation component 52 if the ratio of n/m falls within the region A. Approximation selection circuit 48 outputs the second approximation component 54 if the ratio of n/m falls within region B. Approximation selection circuit 48 outputs the third approximation component 56 if the ratio of n/m falls within region C.

Figure 4:
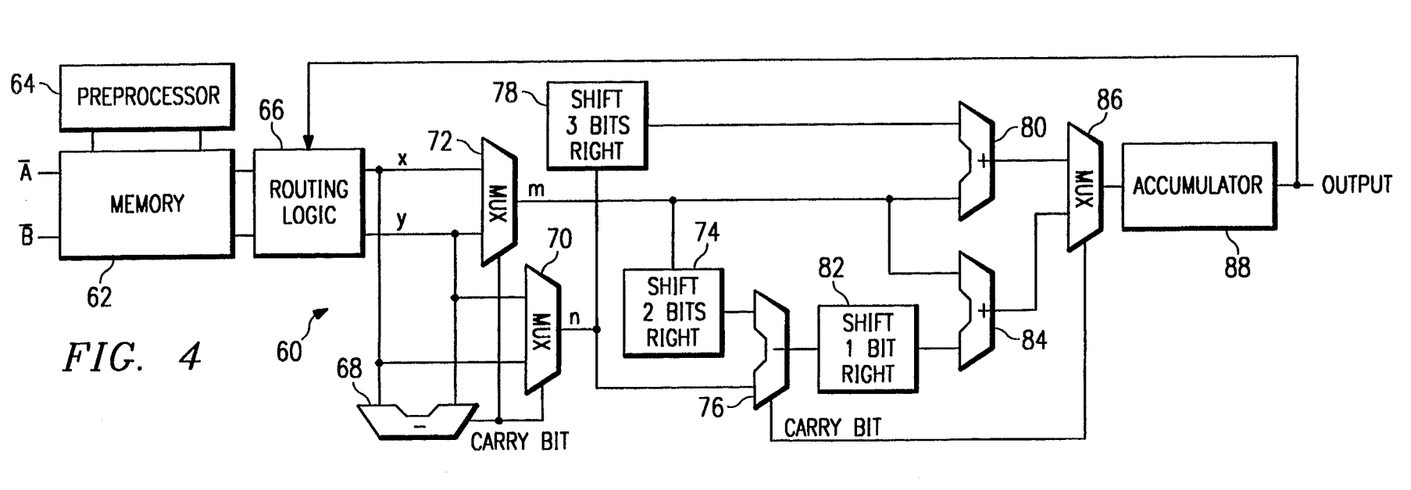
FIG. 4 illustrates a block diagram of a first system for approximating the Euclidean distance between vectors constructed according to the teachings of the present invention.

FIG. 4 illustrates a circuit indicated generally at 60 constructed according to the teachings of the present invention for approximating the Euclidean distance between two vectors, $\bar{A}$ and $\bar{B}$. Circuit 60 comprises a memory circuit 62 that receives and stores the individual components that make up the vectors $\bar{A}$ and $\bar{B}$. A preprocessor circuit 64 reads the corresponding components of the vectors $\bar{A}$ and $\bar{B}$, calculates the difference between the corresponding components, and stores these difference values in memory 62. Routing logic 66 is coupled to memory 62 to read two of the stored difference values the first pass through the circuit 60 and one stored difference value in subsequent passes.

The two outputs of the routing logic 66, x and y, are coupled to subtracter 68 and to first and second multiplexers 70 and 72. The carry bit of subtracter 68 is also connected to multiplexers 70 and 72 which, in combination with subtracter 68, sort the outputs of routing logic 66 such that the output of multiplexer 72, m, is the maximum value of x and y, and the output of multiplexer 70, n, is the minimum value of x and y.

A function of the maximum value, m, and the minimum value, n, is compared with a predetermined breakpoint. The function may comprise a ratio. In one embodiment, the output m of multiplexer 72 is coupled to shifter 74 which shifts the quantity m two bits to the right, effectively dividing m by four. The output of shifter 74, m/4, and the output of multiplexer 70, n, are coupled to subtracter 76 which effectively compares the ratio of n/m with ¼ without actually dividing n by m using a novel technique detailed below.

The output of multiplexer 70, n, is coupled to a shifter 78 wherein the quantity n is shifted three bits to the right to be used in calculating the first of two approximations of the Euclidean distance. The output of shifter 78 and output of multiplexer 72, m, are coupled to adder 80. The output of adder 80 is the first approximation of the Euclidean distance comprising a function of m and n.

The output of subtracter 76 is also used in calculating the second of two approximations of the Euclidean distance by shifting it one bit to the right in shifter 82. The output of shifter 82 and output, m, of multiplexer 72 are coupled to adder 84 piece. The output of adder 84 is the second approximation of the Euclidean distance comprising a function of n and m.

The outputs of adders 84 and 80, the two approximations of the Euclidean distance calculated in this pass through the circuit 60, are coupled to multiplexer 86. The carry bit of subtracter 76 is coupled to control multiplexer 86 to output the appropriate of the two approximations of the Euclidean distance based on whether the ratio of n/m is greater than ¼. The output of multiplexer 86 is added to the accumulator 88 and this value is fed back as an additional input to routing logic 66.

On subsequent passes through the circuit 60, the routing logic 66 will pass the current value of accumulator 88 and a difference value stored in memory circuit 62 as the values x and y. Once all of the difference values stored in memory circuit 62 have passed through routing logic 66, the approximation of the Euclidean distance between vectors $\bar{A}$ and $\bar{B}$ generated by the system of the present invention will be stored in accumulator 88.

In operation, circuit 60 calculates a piecewise linear approximation of equation (1) above. For simplicity, the distance formula may be represented as follows:

$$D = \sqrt{a^2 + b^2 + c^2 + d^2 \ldots} \qquad (3)$$

where a, b, c, and d are the differences between corresponding vector quantities. By substituting into equation (3) the quantity q equal to the square root of $a^2+b^2$ the distance equation becomes:

$$D = \sqrt{(a^2 + b^2) + c^2 + d^2 \ldots} = \sqrt{q^2 + c^2 + d^2 \ldots} \quad (4)$$

A similar substitution into equation (4) of the quantity r equal to the square root of $q^2+c^2$ modifies the distance equation (4) to become:

$$D = \sqrt{r^2 + d^2 + \ldots} \quad (5)$$

If similar substitutions are repeatedly made in the distance equation (5), the distance equation will ultimately be reduced to the form of:

$$D = \sqrt{x^2 + y^2} \quad (6)$$

in which y is one of the differences between corresponding components of the two vectors and x is the square root of the sum of the squares of all the other differences between corresponding components. Because each of the substitutions detailed above and the ultimate equation (6) are in the form of the square root of the sum of two squares, a first order approximation of the square root of the sum of two squares used iteratively will yield a close approximation to the exact distance between the vectors. The truth of this statement may be demonstrated by using 3-dimensional vectors. In three dimensions, the distance equation is:

$$D = \sqrt{x^2 + y^2 + z^2} \quad (7)$$

wherein the quantities x, y, and z represent the difference between the corresponding vector components. This equation may be written in the form:

$$D = \sqrt{(x^2 + y^2) + z^2} \quad (8)$$

and if $p^2$ equals $x^2+y^2$ then:

$$D = \sqrt{p^2 + z^2} \quad (9)$$

Because the quantities x and y are known, the value P may be approximated using an approximation for the square root of the sum of two squares which is a function of the two squared quantities, x and y. Once a value for P is determined, the quantities P and z are known. Using the same approximation for the square root of the sum of two squares as a function of the two squared quantities, now P and z, the distance D of equation (9) may be determined. This iterative technique for approximating the Euclidean distance between vectors is equally applicable to vectors of any dimension.

As discussed above, the Euclidean distance D of equation (3) is iteratively calculated by approximating an equation of the form:

$$P = \sqrt{x^2 + y^2} \quad (10)$$

this equation can be rewritten in the form:

$$P = x\sqrt{1 + \left(\frac{y}{x}\right)^2} \quad (11)$$

if x is the larger of the two quantities x and y, then the number under the radical will be equal to 1 plus a number which is less than 1. Therefore, the product P will be equal to x times a number between 1 and the square root of 2 depending on the ratio of y to x.

Figure 5:
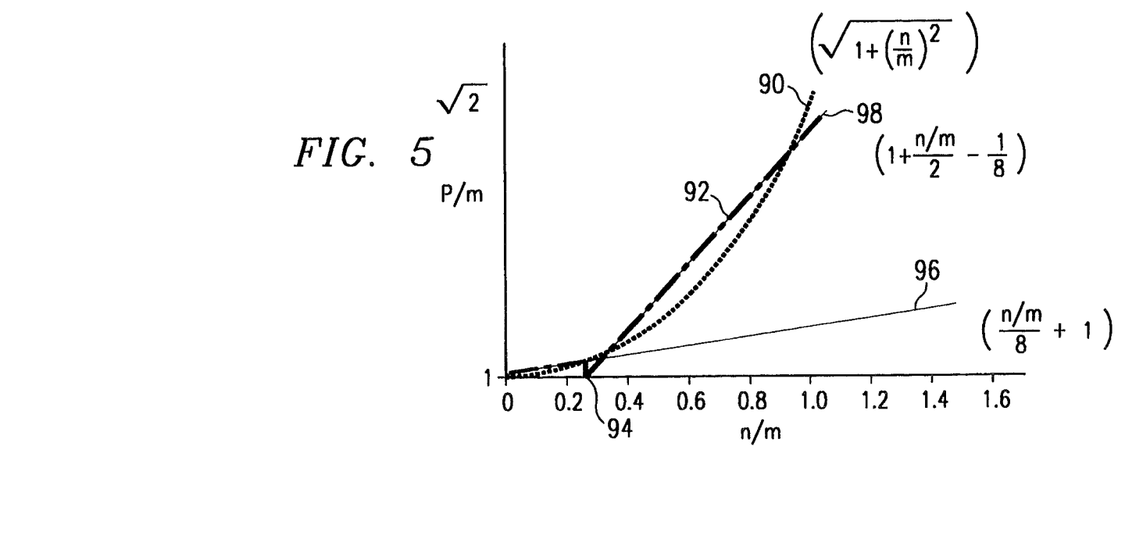
FIG. 5 is a graphical representation of the approximation used in the first system for approximating the Euclidean distance according to the teachings of the present invention.

FIG. 5 graphically represents the approximation used in the first system for approximating Euclidean distance according to the present invention. In FIG. 5, the quantities n and m have been substituted for y and x respectively. Curve 90 represents the equation:

$$P/m = \sqrt{1 + \left(\frac{n}{m}\right)^2} \quad (12)$$

which is the exact calculation of the normalized square root of the sum of two squares. Curve 92 represents one approximation used in the teachings of the present invention. For values of n/m between zero and the predetermined breakpoint 94, which according to one embodiment comprises one-quarter, the approximation curve 92 follows a first approximation component 96. First approximation component 96 according to one embodiment comprises a function of m and n according to the following equation:

$$P/m = 1 + \frac{\left(\frac{n}{m}\right)}{8} \quad (13)$$

It should be noted that first approximation component 96 may comprise a constant.

For values of n/m greater than the predetermined breakpoint 94, the approximation curve 92 follows the second approximation component 98 according to the following equation:

$$P/m = 1 + \left(\frac{\left(\frac{n}{m}\right)}{2} - \frac{1}{8}\right) \quad (14)$$

The circuit 60 of FIG. 4 produces the approximation curve 92 of FIG. 5 by first sorting the outputs, x and y, received from routing logic 66. Subtracter 68 calculates the difference between the outputs x and y of routing logic 66 and produces a carry bit. Based on this carry bit produced by subtracter 68, multiplexer 22 outputs the maximum value, m, of the values x and y, while the multiplexer 70 outputs the minimum value, n, of the values x and y. Once the values n and m are obtained, the ratio of n/m is compared with the predetermined breakpoint 94 of FIG. 5 using shifter 74 and subtracter 76. In subtracter 76, the quantity m/4 is subtracted from the quantity n and a carry bit is produced. This process is represented by the equation:

$$D = n - m/4 \quad (15)$$

If D is greater than zero, equation (15) may be rewritten as:

$$n/m > \tfrac{1}{8} \qquad (16)$$

whereas if D is less than zero, equation (15) may be rewritten as:

$$n/m < \tfrac{1}{8} \qquad (17)$$

The carry bit of subtracter 76, therefore, will determine how the ratio of n/m compares with $\tfrac{1}{8}$, without actually dividing n by m, and will determine which approximation component of curve 92 of FIG. 5 will be used to approximate curve 90 during this pass through the circuit 60.

The circuit 60 of FIG. 4 calculates the first approximation component 96 by shifting the quantity n three bits to the right in shifter 78, effectively dividing n by eight, and adding the quantity m to that shifted quantity in adder 80. Meanwhile, the circuit 60 calculates the second approximation component 98 by shifting the output of subtracter 76 one bit to the right in shifter 82 and adding the quantity m to the output of shifter 82 in adder 84. Based on the carry bit of subtracter 76, the multiplexer 86 will either output the output of adder 80 or the output of adder 84 to accumulator 88 depending on how the ratio of n/m compares with the predetermined breakpoint 94.

Figure 6:
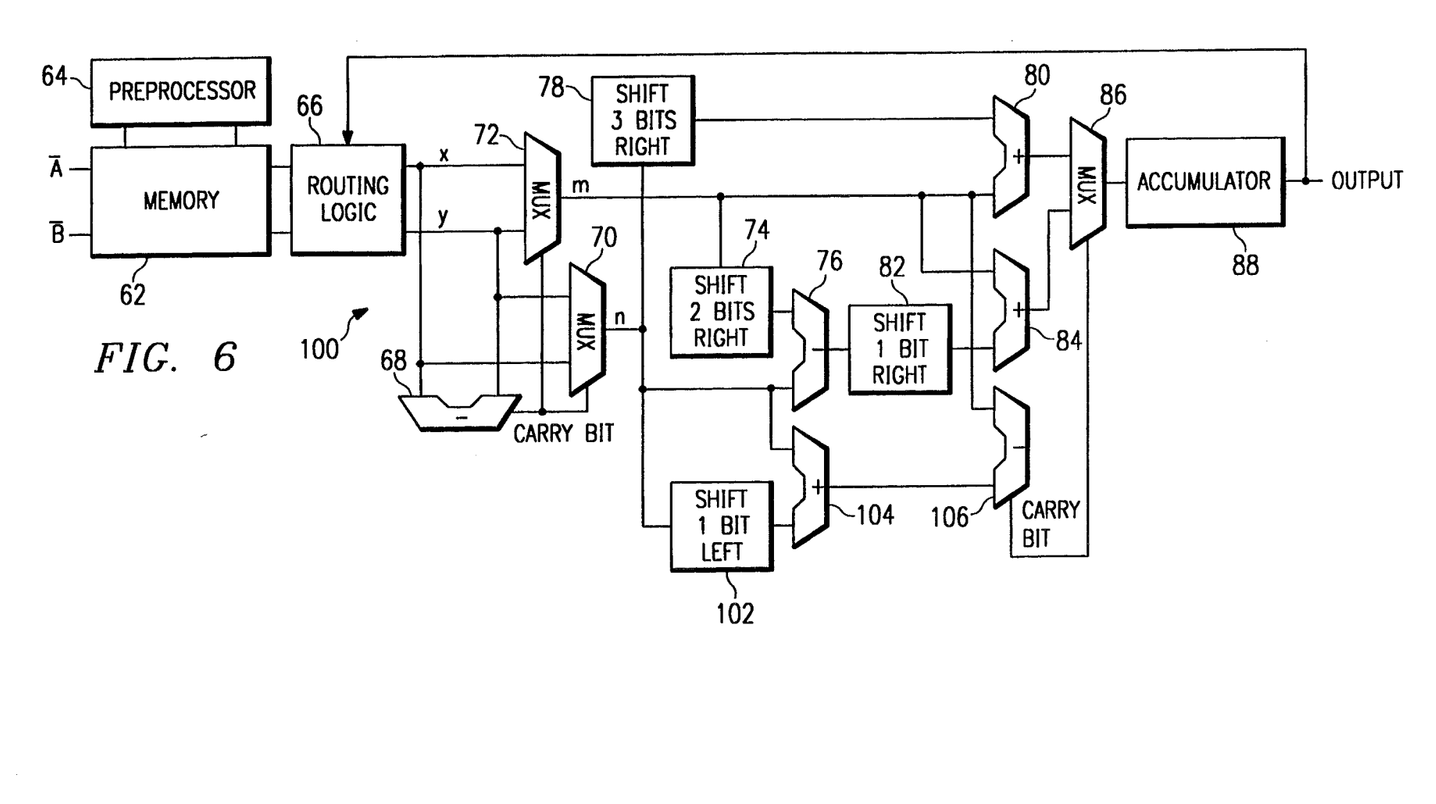
FIG. 6 illustrates a block diagram of a second system for approximating the Euclidean distance between vectors constructed according to the teachings of the present invention.

FIG. 6 illustrates a second system for approximating Euclidean distance between vectors indicated generally at 100 and constructed according to the teachings of the present invention. Circuit 100 is an alternative embodiment of circuit 60 of FIG. 4. Circuit 100 comprises all of the components of circuit 60 and three additional components for calculating an alternative breakpoint. In this embodiment, the breakpoint comprises one-third. The output n of multiplexer 70 is coupled to a shifter 102 which shifts the quantity n by 1 bit to the left, effectively multiplying n by 2. The output n of multiplexer 70 is also coupled to an input of an adder 104. The output of shifter 102 is also coupled to an input of adder 104. The output of adder 104, 3 n, and the output of multiplexer 72, m, are coupled to a subtracter 106 which effectively compares the ratio of n/m with one-third without actually dividing n by m in a similar manner as described with respect to FIGS. 4 and 5. In this embodiment, the carry bit of subtracter 106 is coupled to control multiplexer 86. Unlike the embodiment of FIG. 4, the carry bit of subtracter 76 is not coupled to control the multiplexer 86.

Figure 7:
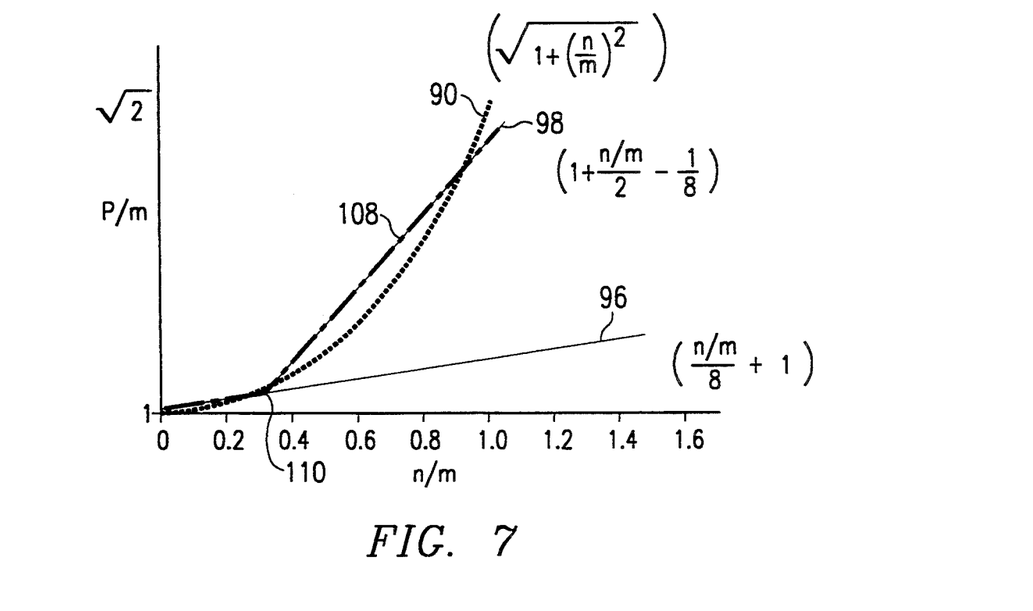
FIG. 7 is a graphical representation of the approximation used in the second system for approximating the Euclidean distance according to the teachings of the present invention.

FIG. 7 graphically represents the approximation used in the second system for approximating Euclidean distance according to the present invention. As with FIG. 5, curve 90 represents the exact calculation of the normalized square root of the sum of two squares. Curve 108 represents one approximation used in the teaching of the present invention. For values of n/m between zero and the predetermined breakpoint 110 which according to this embodiment comprises $\tfrac{1}{3}$, the approximation curve 108 follows the first approximation component 96. For values of n/m greater than the predetermined breakpoint 110, the approximation curve 108 follows the second approximation component 98.

The circuit of FIG. 6 produces the approximation curve 108 of FIG. 7 in the same manner as the circuit of FIG. 4 with the exception of the calculation of the breakpoint 110. Once the values n and m are obtained in multiplexer 72 and multiplexer 70, the ratio of n/m is compared with the predetermined breakpoint 110 of FIG. 7 using shifter 102, adder 104, and subtracter 106. In subtracter 106, the quantity m is subtracted from the quantity 3 n and a carry bit is produced. This process is represented by the equation:

$$D = 3n - m \qquad (18)$$

if D is greater than zero, equation (18) may be rewritten as $$n/m > \tfrac{1}{3} \qquad (19)$$

whereas if D is less than zero equation (18) may be rewritten as $$n/m < \tfrac{1}{3}. \qquad (20)$$

The carry bit of subtracter 106, therefore, will determine how the ration of n/m compares with $\tfrac{1}{3}$, without actually dividing n by m, and will determine which approximation component of curve 108 of FIG. 7 will be used to approximate curve 90 during this pass through the circuit 100.

Figure 8:
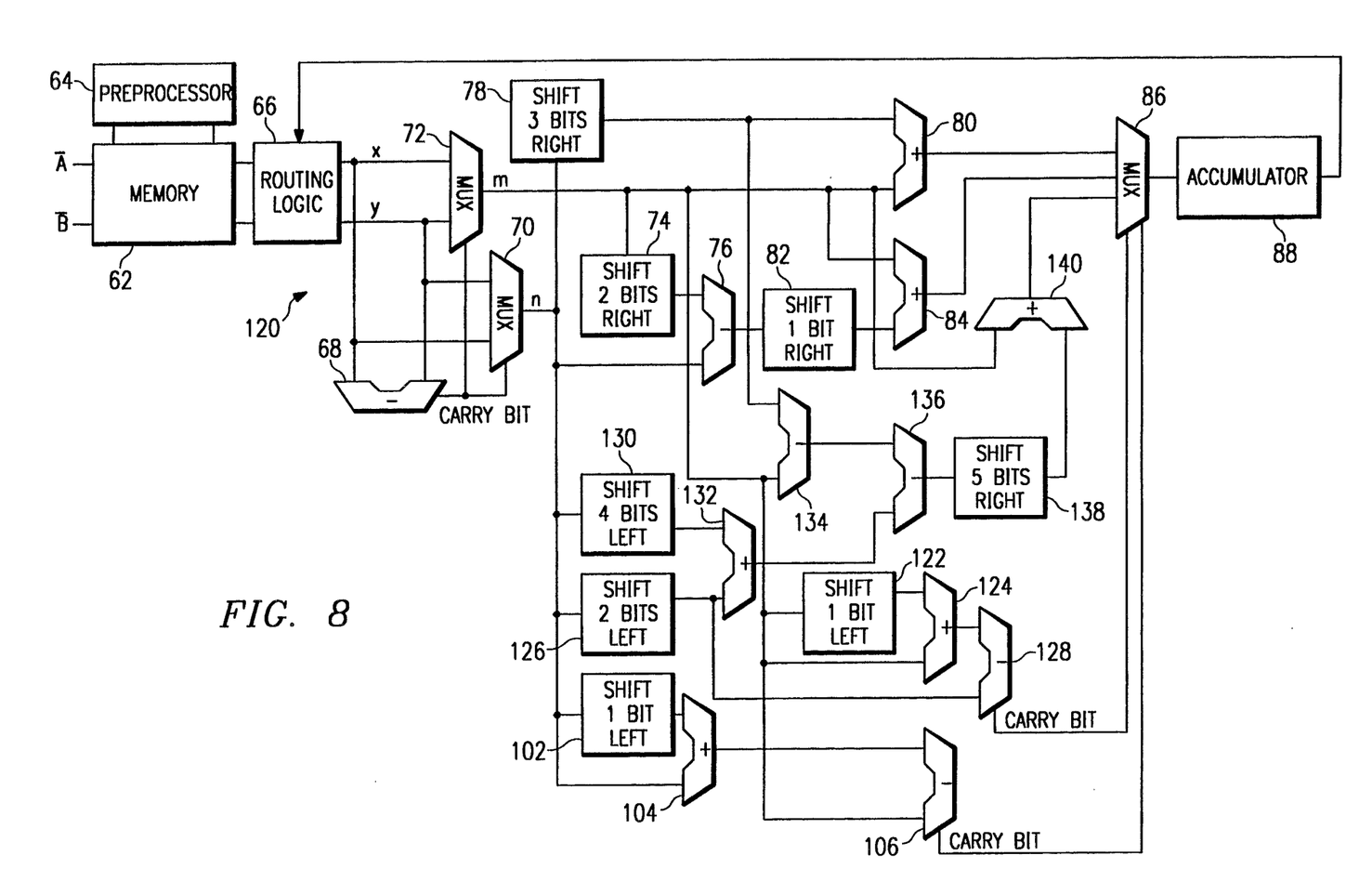
FIG. 8 illustrates a block diagram of a third system for approximating the Euclidean distance between vectors constructed according to the teachings of the present invention.

FIG. 8 illustrates a third system for approximating the Euclidean distance between vectors indicated generally at 120 and constructed according to the teachings of the present invention. Circuit 120 is an alternative embodiment of circuit 100 comprising three approximations of the Euclidean distance and two breakpoints. Circuit 120 is substantially identical to circuit 100 with the addition of 10 components for calculating the third approximation and the second breakpoint.

In this embodiment, the second breakpoint comprises $\tfrac{3}{4}$. The output m of multiplexer 72 is coupled to a shifter 122 wherein the quantity m is shifted one bit to the left so as to multiply the quantity m by two. The output of shifter 122 and the output m of multiplexer 72 are coupled to an adder 124. The output n of multiplexer 70 is coupled to a shifter 126 wherein the quantity n is shifted two bits to the left so as to multiply the quantity n by four. The output of adder 124, 3 m, is subtracted from the output of shifter 126, 4 n, in subtracter 128 which effectively compares the ratio of n/m with $\tfrac{3}{4}$ without actually dividing n by m using the novel technique detailed above. The carry bit of subtracter 128 is coupled to multiplexer 86.

In this embodiment, a third approximation of the Euclidean distance is calculated. The output of n of multiplexer 70 is coupled to shifter 130 wherein the quantity n is shifted 4 bits to the left so as to multiply the quantity n by 16. The output of shifter 130 and shifter 126 are added in an adder 132. The output m of multiplexer 72 is subtracted from the output of shifter 78 in subtracter 134. The output of subtracter 134 is subtracted from the output of adder 132 in subtracter 136. The output of subtracter 136, 20 n − 7 m, is coupled to a shifter 138 wherein the quantity 20 n − 7 m is shifted 5 bits to the right so as to divide the quantity 20 n − 7 m by 32. The output of multiplexer 72 and the output of shifter 138 are coupled to an adder 140. The output of adder 140 is coupled to an input of multiplexer 86. The output of adder 140 comprises the third approximation of the Euclidean distance.

Figure 9:
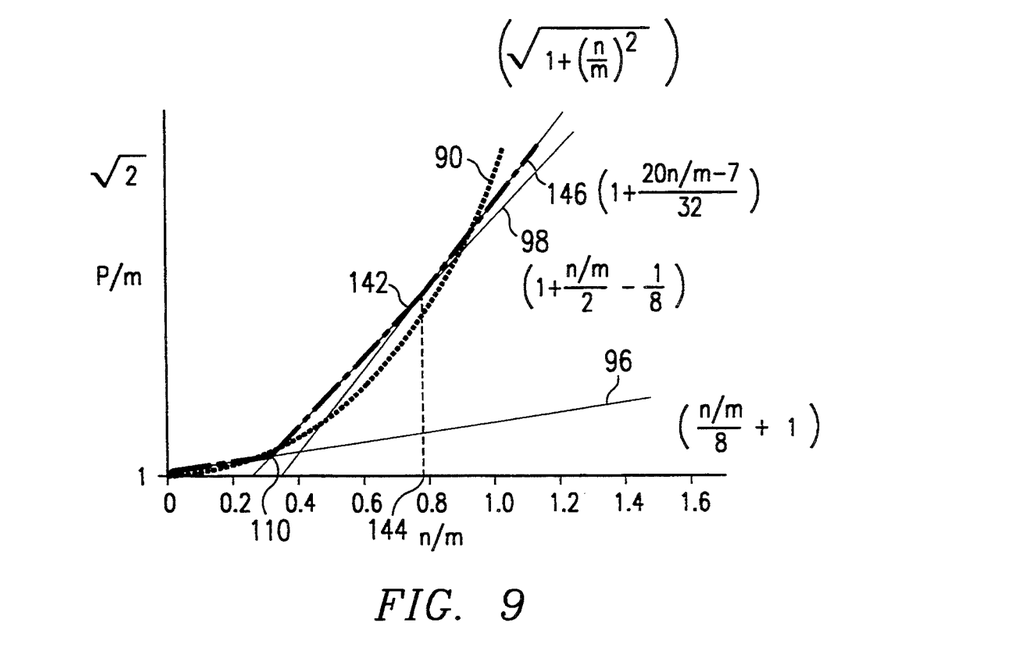
FIG. 9 is a graphical representation of the approximation used in the third system for approximating the Euclidean distance according to the teachings of the present invention.

FIG. 9 graphically represents the approximation used in the third system for approximating Euclidean distance according to the teachings of the present invention. Curve 142 represents one approximation used in the teachings of the present invention. For values of n/m between zero and the first predetermined breakpoint 110, which according to this embodiment comprises ⅛, the approximation curve 142 follows a first approximation component 96. For values of n/m greater than the first predetermined breakpoint 110 and less than the second predetermined breakpoint 144, the approximation curve 142 follows the second approximation component 98. For values of n/m greater than the second predetermined breakpoint 144, the approximation curve 142 follows the third approximation component 146 according to the following equation:

$$\frac{P}{m} = 1 + \left( \frac{20\left(\frac{n}{m}\right) - 7}{32} \right) \quad (21)$$

The circuit 120 of FIG. 8 produces the approximation curve 142 of FIG. 9 in the same manner as the circuit 100 of FIG. 6 with the addition of calculating the second predetermined breakpoint 144 and the third approximation component 146.

Once the values of n and m are obtained, the ratio of n/m is compared with the second predetermined breakpoint 144 of FIG. 9 using shifter 122, adder 124, shifter 126, and subtracter 128. In subtracter 128, the quantity 3 m is subtracted from the quantity 4 n and a carry bit is produced. This process is represented by the equation:

$$D = 4n - 3m \quad (22)$$

If D>0, the equation (22) may be rewritten as:

$$n/m > \tfrac{3}{4} \quad (23)$$

whereas if D<0, equation (22) may be rewritten as:

$$n/m < \tfrac{3}{4}. \quad (24)$$

The carry bit of subtracter 128, therefore, will determine how the ratio of n/m compares with ¾ without actually dividing n by m, and, in combination with the carry bit of subtracter 106, will determine which approximation component of curve 142 of FIG. 9 will be used to approximate curve 90 during this pass through the circuit 120.

The circuit 120 of FIG. 8 calculates the third approximation component 146 in adder 140 by adding the output m of multiplexer 72 to the output, $$\frac{20 - 7m}{32},$$

of shifter 138.

Figure 10:
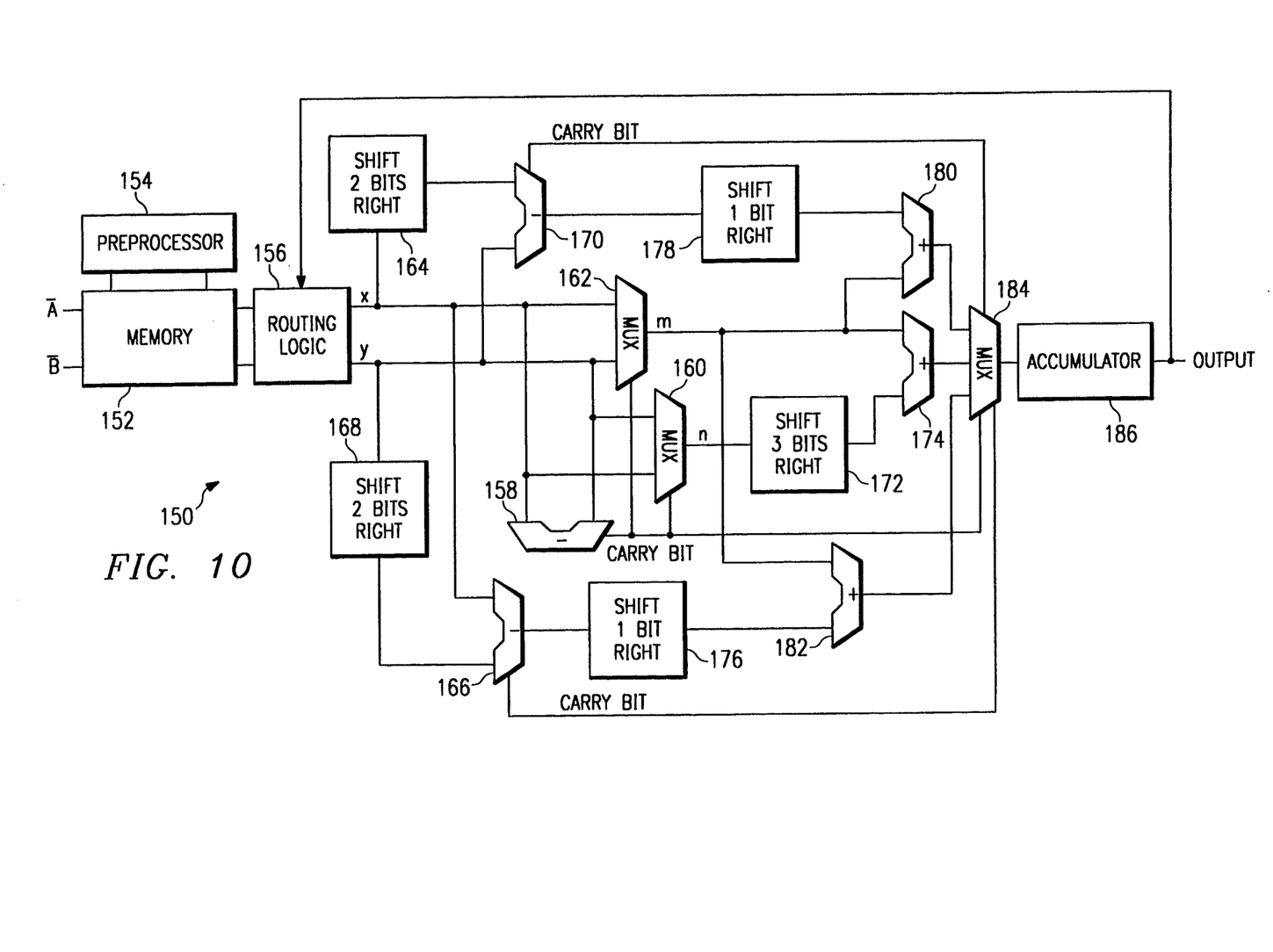
FIG. 10 illustrates a block diagram of a fourth system for approximating the Euclidean distance between vectors constructed according to the teachings of the present invention.

FIG. 10 illustrates a circuit indicated generally at 150 constructed according to the teachings of the present invention for approximating the Euclidean distance between two vectors, $\bar{A}$ and $\bar{B}$. The circuit 150 comprises a memory circuit 152 which receives and stores the individual components that make up the vectors $\bar{A}$ and $\bar{B}$. Preprocessor circuit 154 reads the corresponding components of vectors $\bar{A}$ and $\bar{B}$, calculates the difference between the corresponding components of the vectors, and stores these difference values in memory 152. Routing logic 156 is coupled to memory 152 to read two of the stored difference values the first pass through the circuit 150 and one stored difference value on subsequent passes. The two outputs of the routing logic 156, x and y, are coupled to subtracter 158 and to first and second multiplexers 160 and 162. The carry bit of subtracter 158 is also connected to the multiplexers 160 and 162, which in combination with subtracter 158, sort the outputs, x and y, of routing logic 156 such that the output of multiplexer 160, n, is the minimum value of x and y, and the output of multiplexer 162, m, is the maximum value of x and y.

A function of the outputs, x and y, of routing logic 156 is compared with a predetermined breakpoint. The function may be a ratio. In one embodiment, output x of routing logic 156 is coupled to shifter 164 and subtracter 166. Output y of routing logic 156 is coupled to shifter 168 and subtracter 170. The remaining input of subtracter 170, is coupled to the output of shifter 164. The remaining input of subtracter 166 is coupled to the output of shifter 168. Subtracters 166 and 170 effectively compare the ratios of x/y and y/x with ¼ using the same novel technique detailed above.

The output of multiplexer 160, n, is coupled to shifter 172 wherein the quantity n is shifted three bits to the right to be used in the first of two approximations of the Euclidean distance. The output of shifter 172 and the output, m, of multiplexer 162 are coupled to adder 174. The output of adder 174 is the first approximation of the Euclidean distance comprising a function of n and m.

The output of subtracters 166 and 170 are also used in calculating alternative second approximations of the Euclidean distance by shifting the outputs of subtracters 166 and 170 one bit to the right in shifters 176 and 178 respectively. The output of shifter 178 and the output, m, of multiplexer 162 are coupled to adder 180 wherein a first alternative second approximation of the Euclidean distance as a function of n and m is calculated. The output of shifter 176 and the output, m, of multiplexer 162 are coupled to adder 182 wherein a second alternative second approximation of the Euclidean distance as a function of n and m is calculated.

The outputs of adders 174, 180, and 182 are coupled to multiplexer 184 that outputs the appropriate approximation of the Euclidean distance depending on the carry bits generated by subtracters 158, 166 and 170 which are coupled to multiplexer 184. The output of multiplexer 184 is added to the current value of accumulator 186 and the output of the accumulator 186 is fed back as an additional input to the routing logic 156. On subsequent passes through circuit 150, the routing logic 156 will pass the current value of the accumulator 186 and a difference value stored in memory 152 as the values x and y. Once all of the difference values stored in memory 152 have passed through the routing logic 156, the approximation of the Euclidean distance between vectors $\bar{A}$ and $\bar{B}$ generated by the system of the present invention is stored in accumulator 186.

In operation, circuit 150 calculates a first order approximation of equation (1) in much the same manner as circuit 60 of FIG. 4. The only difference between the operation of circuit 60 and circuit 150 inheres in the comparison of the ratio of the maximum value, m, to the minimum value, n, with a predetermined breakpoint 94. In circuit 60, this comparison is carried out in subtracter 76 and shifter 74 after the values x and y received from routing logic 76 are sorted in multiplexers 70 and 72. In circuit 120, this comparison is accomplished prior to sorting the values x and y of routing logic 156. Alternative comparisons are made using subtracter 170 In combination with shifter 164 and subtracter 166 in combination with shifter 168. Multiplexer 184 is controlled by carry bits from subtracters 158, 166, and 170 to output the appropriate approximation of the Euclidean distance.

Although the present invention has been described in detail, it should be understood that various changes, substitutions, and alterations can be made hereto without departing from the spirit and scope of the invention as defined by the appended claims.

What is claimed is:

1. A system for approximating a nonlinear function, said system comprising:
    circuitry for shifting a first quantity so as to multiply said first quantity by up to three integer powers of two;
    circuitry for shifting a second quantity so as to multiply said second quantity by up to three integer powers of two;
    circuitry in communication with said circuitry for shifting said first and said second quantities for generating a first function of said first and said second quantities;
    circuitry in communication with said circuitry for shifting said first and said second quantities for generating a second function of said first and said second quantities;
    circuitry in communication with said circuitry for generating a first function for generating a first approximation by dividing said first function by an integer multiple of two in a shifter;
    circuitry in communication with said circuitry for generating a second function for generating a second approximation by dividing said second function by an integer multiple of two in a shifter; and
    circuitry in communication with said circuitry for generating said first and said second approximations for selecting between said first and said second approximations.

2. The system of claim 1, wherein said circuitry for selecting comprises circuitry for outputting the larger of either said first or said second approximation.

3. The system of claim 1, wherein said circuitry for selecting comprises:
    circuitry for outputting said first approximation if a ratio of said first and said second quantities is less than a predetermined breakpoint; and
    circuitry for outputting said second approximation if a ratio of said first and said second quantities is greater than a predetermined breakpoint.

4. A system for approximating a function, said system comprising:
    circuitry for shifting a first quantity so as to multiply said first quantity by up to three integer powers of two;
    circuitry for shifting a second quantity so as to multiply said second quantity by up to three integer powers of two;
    circuitry in communication with said circuitry for shifting said first and said second quantities for generating a first function of said first and said second quantities;
    circuitry in communication with said circuitry for shifting said first and said second quantities for generating a second function of said first and said second quantities;
    circuitry in communication with said circuitry for shifting said first and said second quantities for generating a third function of said first and said second quantities;
    circuitry in communication with said circuitry for generating a first function for generating a first approximation by dividing said first function by an integer multiple of two in a shifter;
    circuitry in communication with said circuitry for generating a second function for generating a second approximation by dividing said second function by an integer multiple of two in a shifter;
    circuitry in communication with said circuitry for generating a second function for generating a third approximation by dividing said second function by an integer multiple of two in a shifter; and
    circuitry in communication with said circuitry for generating said first, said second, and said third approximations for selecting between said first, said second, and said third approximations.

5. The system of claim 4, wherein said circuitry for selecting comprises circuitry for outputting the larger of either said first, said second, or said third approximation.

6. The system of claim 4, wherein said circuitry for selecting comprises:
    circuitry for outputting said first approximation if said first approximation is greater than said second approximation;
    circuitry for outputting said second approximation if said second approximation is greater than said first approximation and said second approximation is less than said third approximation; and
    circuitry for outputting said third approximation if said second approximation is greater than said first approximation and said third approximation is greater than said second approximation.

7. The system of claim 4, wherein said circuitry for selecting comprises:
    circuitry for outputting said first approximation if a ratio of said first and second quantities is less than a first predetermined breakpoint;
    circuitry for outputting said second approximation if a ratio of said first and second quantities is between said first predetermined breakpoint and a second predetermined breakpoint; and
    circuitry for outputting said third approximation if a ratio of said first and second quantities is greater than said second predetermined breakpoint.

8. A system for processing vectors, said system comprising:
    circuitry for calculating a first approximation as a function of first and second differences between corresponding vector components, said circuitry for calculating a first approximation comprises
        circuitry for selecting first and second differences,
        circuitry, coupled to said selecting circuitry, for outputting a maximum value and a minimum value from said first and second selected differences, and
        circuitry, in communication with said selecting circuitry and said outputting circuitry, for calculating a first approximation as a function of said maximum and said minimum values;
    circuitry for calculating a second approximation as a second function of said first and second differences, said circuitry for calculating a second approximation comprising circuitry for selecting first and second differences, circuitry, coupled to said selecting circuitry, for outputting a maximum value and a minimum value from said first and second selected differences, and circuitry, in communication with said selecting circuitry and said outputting circuitry, for calculating a second approximation as a function of said maximum and said minimum values; and circuitry, in communication with said circuitry for calculating a first approximation and said circuitry for calculating a second approximation, for selecting between said first and said second approximations by comparing a third function of said first and second differences with a predetermined breakpoint; said circuitry for calculating and said circuitry for selecting consists of shifters, adders, and multiplexers.

9. The system of claim 8, wherein said circuitry for selecting between said first and second approximations comprises:

circuitry for selecting first and second differences;

circuitry, coupled to said selecting circuitry, for outputting a maximum value and a minimum value from said first and second selected differences;

circuitry, in communication with said selecting circuitry, for comparing a third function of said first difference and said second difference with a predetermined breakpoint; and circuitry, coupled to said comparing circuitry, said circuitry for calculating a first approximation, and said circuitry for calculating a second approximation, for outputting either said first approximation or said second approximation.

10. A system for approximating the Euclidean distance between first and second vectors, said system comprising:

circuitry for storing a value corresponding to each component of the first and second vectors;

circuitry, coupled to said storing circuitry, for computing a difference between corresponding components of the first and second vectors and storing said difference in said storing circuitry;

circuitry, coupled to said storing circuitry, for selecting first and second values, at least one of said first and second values comprising one of said differences;

circuitry, coupled to said selecting circuitry, for outputting a maximum value and a minimum value from said first and second selected values;

circuitry, in communication with said outputting circuitry, for comparing a first function of said maximum value and said minimum value with a predetermined breakpoint;

circuitry, coupled to said comparing circuitry and said outputting circuitry, for adding a second function of said first and said second values to an accumulator if said first function is less than or equal to said predetermined breakpoint; and circuitry, coupled to said outputting circuitry, for adding a third function of said first and said second values to said accumulator if said first function is greater than said predetermined breakpoint an output of said accumulator coupled to said circuitry for selecting.

11. The system of claim 10, wherein said circuitry for outputting a maximum value and a minimum value comprises:

a first multiplexer, coupled to said selecting circuitry and operable to output the maximum value of said first and second values;

a second multiplexer, coupled to said selecting circuitry and operable to output the minimum value of said first and second values; and a subtracter, coupled to said selecting circuitry, wherein said first value is subtracted from said second value to generate a carry bit transmitted to said first and second multiplexers and operable to control the output of said first and second multiplexers.

12. The system of claim 10, wherein said circuitry for comparing comprises:

a shifter, coupled to receive said maximum value from said outputting circuitry, for shifting said maximum value 2 bits to the right so as to divide said maximum value by 4; and a subtracter, coupled to receive said minimum value from said outputting circuitry and an output from said shifter, for generating a carry bit to indicate if a ratio of said minimum value to said maximum value is less than $\frac{1}{4}$.

13. The system of claim 10, wherein said circuitry for comparing comprises:

a shifter, coupled to receive said minimum value from said outputting circuitry, for shifting said minimum value 1 bit to the left so as to multiply said minimum value by 2;

an adder coupled to add said minimum value from said outputting circuitry to an output of said shifter; and a subtracter, coupled to receive said maximum value from said outputting circuitry and an output from said adder, for generating a carry bit to indicate if a ratio of said minimum value to said maximum value is less than $\frac{1}{3}$.

14. The system of claim 10, wherein said circuitry for comparing comprises:

a first shifter, coupled to receive said first value from said selecting circuitry, for shifting said first value 2 bits to the right so as to divide said first value by 4;

a first subtracter, coupled to receive said second value from said selecting circuitry and an output from said first shifter, for generating a carry bit to indicate if a ratio of said second value to said first value is less than $\frac{1}{4}$;

a second shifter, coupled to receive said second value from said selecting circuitry, for shifting said second value 2 bits to the right so as to divide said second value by 4; and a second subtracter, coupled to receive said first value from said selecting circuitry and an output from said second shifter, for generating a carry bit to indicate if a ratio of said first value to said second value is less than $\frac{1}{4}$.

15. The system of claim 10, wherein said circuitry for adding a second function and said circuitry for adding a third function comprise:

a first shifter, coupled to receive said minimum value from said outputting circuitry, for shifting said minimum value 3 bits to the right so as to divide said minimum value by 8;

a second shifter, coupled to an output of said comparing circuitry, for shifting said output 1 bit to the right so as to divide said output of said comparing circuitry by 2;

a first adder, coupled to receive said maximum value from said outputting circuitry and an output of said first shifter, for adding said maximum value and said output of said first shifter;

a second adder, coupled to receive said maximum value from said outputting circuitry and an output of said second shifter, for adding said maximum value and said output of said second shifter;

a multiplexer, coupled to receive outputs from said first and second adders and coupled to a control bit from said comparing circuitry, wherein an output of said multiplexer is controlled to either be said output of said first adder or said output of said second adder; and an accumulator, coupled to said output of said multiplexer, for summing said output of said multiplexer, having an output coupled to said circuitry for selecting.

16. The system of claim 10, wherein said circuitry for adding a second function and said circuitry for adding a third function comprise:

a first shifter, coupled to receive said minimum value from said outputting circuitry, for shifting said minimum value 3 bits to the right so as to divide said minimum value by 8;

a second shifter, coupled to a first alternative output of said comparing circuitry, for shifting said output 1 bit to the right so as to divide said first alternative output of said comparing circuitry by 2;

a third shifter, coupled to a second alternative output of said comparing circuitry, for shifting said second output 1 bit to the right so as to divide said alternative output of said comparing circuitry by 2;

a first adder, coupled to receive said maximum value from said outputting circuitry and an output of said first shifter, for adding said maximum value and said output of said first shifter;

a second adder, coupled to receive said maximum value from said outputting circuitry and an output of said second shifter, for adding said maximum value and said output of said second shifter;

a third adder, coupled to receive said maximum value from said outputting circuitry and an output of said third shifter, for adding said maximum value and said output of said third shifter;

a multiplexer, coupled to receive outputs from said first, second and third adders and coupled to control bits of said comparing circuitry, wherein an output of said multiplexer is controlled to be said output of said first adder, said output of said second adder or said output of said third adder; and an accumulator, coupled to said output of said multiplexer, for summing said output of said multiplexer, having an output coupled to said circuitry for selecting.

17. The system of claim 10, wherein said circuitry for adding a second function and said circuitry for adding a third function comprise:

a first shifter, coupled to receive said maximum value from said outputting circuitry, for shifting said maximum value 2 bits to the right so as to divide said maximum value by 4;

a subtracter coupled to subtract said minimum value from said outputting circuitry and an output from said first shifter;

a second shifter, coupled to receive said minimum value from said outputting circuitry, for shifting said minimum value 3 bits to the right so as to divide said minimum value by 8;

a third shifter, coupled to an output of said subtracter, for shifting said output 1 bit to the right so as to divide said output of said subtracter by 2;

a first adder, coupled to receive said maximum value from said outputting circuitry and an output of said second shifter, for adding said maximum value and said output of said second shifter to form a first adder output;

a second adder, coupled to receive said maximum value from said outputting circuitry and an output of said third shifter, for adding said maximum value and said output of said third shifter to form a second adder output;

a multiplexer, coupled to receive said first and second adder output and coupled to a control bit from said comparing circuitry, wherein an output of said multiplexer is controlled to either be said first adder output or said second adder output; and an accumulator, coupled to said output of said multiplexer, for summing said output of said multiplexer, having an output coupled to said circuitry for selecting.

18. A system for approximating the Euclidean distance between first and second vectors, said system comprising:

circuitry for storing a value corresponding to each component of the first and second vectors;

circuitry, coupled to said storing circuitry, for computing a difference between corresponding components of the first and second vectors and storing said difference in said storing circuitry;

circuitry, coupled to said storing circuitry, for selecting first and second values, at least one of said first and second values comprising one of said differences;

circuitry, coupled to said selecting circuitry, for outputting a maximum value, m, and a minimum value, n, from said first and second selected values;

circuitry, in communication with said selecting circuitry, for comparing a first function of said first value and said second value with a first predetermined breakpoint and said first function of said second value and said first value with a second predetermined breakpoint;

circuitry, coupled to said comparing circuitry and said outputting circuitry, for adding a second function of said first and said second values to an accumulator if said first function is less than or equal to said first predetermined breakpoint;

circuitry, coupled to said comparing circuitry and said outputting circuitry, for adding a third function of said first and said second values to said accumulator if said first function is greater than said first predetermined breakpoint and said first function is less than said second breakpoint; and circuitry, coupled to said comparing circuitry and said outputting circuitry, for adding a fourth function of said first and said second values to said accumulator if said first function is greater than said second predetermined breakpoint an output of said accumulator coupled to said circuitry for selecting.

19. The system of claim 18, wherein said first predetermined breakpoint comprises $\frac{1}{3}$ and said second predetermined breakpoint comprises $\frac{3}{4}$.

20. The system of claim 18, wherein said second function is $m+n/8$.

21. The system of claim 18, wherein said third function is $m+n/2-m/8$.

22. The system of claim 18, wherein said fourth function is $$m + \frac{20n - 7m}{32}.$$

23. A method for calculating the Euclidean distance between first and second vectors, said method comprising the steps of:
   storing in a memory circuit a value corresponding to each component of the first and second vectors;
   computing in a subtracter circuit a difference between corresponding components of the first and second vectors;
   storing the calculated differences in a memory circuit;
   selecting two values, at least one of the two selected values being one of the stored differences;
   determining a maximum value and a minimum value from the selected values;
   comparing a first function of the selected values with a predetermined breakpoint;
   adding a second function of the selected values to an accumulator if the first function is less than or equal to a predetermined breakpoint;
   adding a third function of the selected values to said accumulator if the first function is greater than the predetermined breakpoint; and
   reiterating said steps of selecting two values, comparing the selected values, comparing a first function, and adding to an accumulator, wherein said step of selecting two values selects one stored difference and the accumulator, until all the stored differences have been selected.

24. The method of claim 23, wherein said step of determining a maximum value and a minimum comprises the steps of:
   subtracting the two selected values in a subtracter thereby generating a carry bit;
   passing the selected values through a first multiplexer to output a maximum value based on the carry bit generated by the subtracter; and
   passing the selected values through a second multiplexer to output a minimum value based on the carry bit generated by the subtracter.

25. The method of claim 23, wherein said step of comparing a ratio comprises the steps of:
   dividing the maximum value by 4 by shifting the maximum value 2 bits to the right in a shifter;
   subtracting the minimum value and the shifted maximum value in a subtracter; and
   generating a carry bit in the subtracter to indicate whether a ratio of the minimum value to the maximum value is greater than, equal to, or less than the predetermined breakpoint.

26. The method of claim 23, wherein said step of comparing a ratio comprises the steps of:
   dividing the two selected values by 4 by shifting the two selected value 2 bits to the right in first and second shifters;
   subtracting the first selected value and the shifted second value in a first subtracter;
   subtracting the second selected value and the shifted first value in a second subtracter; and
   generating a carry bit in the first subtracter and a carry bit in the second subtracter to indicate whether the ratios are greater than, equal to, or less than the predetermined breakpoint; said step of comparing a ratio being performed substantially simultaneously with said step of determining the maximum and the minimum values.

27. The method of claim 23, wherein said steps of adding a first combination and adding a second combination comprise the steps of:
   dividing the minimum value by 8 by shifting the minimum value 3 bits to the right in a shifter;
   dividing an output of the step of comparing the ratio by 2 by shifting the output of the step of comparing the ratio one bit to the right in a shifter;
   adding the maximum value and the shifted minimum value in an adder;
   adding the maximum value and the shifted output of the step of comparing the ratio in an adder;
   outputting the sum generated by one of the two adding steps based on an output of the step of comparing the ratio in a multiplexer; and
   adding the output generated by the outputting step to an accumulator.

28. The method of claim 23, wherein said step of adding a first combination and adding a second combination comprise the steps of:
   dividing the minimum value by 8 by shifting the minimum value 3 bits to the right in a shifter;
   dividing a first output of the comparing the ratio step by 2 by shifting the first output of the comparing the ratio step one bit to the right;
   dividing a second output of the comparing the ratio step by 2 by shifting the second output of the comparing the ratio step one bit to the right to divide by 2;
   adding the maximum value and the shifted minimum value in an adder;
   adding the maximum value and the shifter first output of the step of comparing the ratio in an adder;
   adding the maximum value and the shift second output of the step of comparing the ratio in an adder;
   outputting the sum generated by one of the three adding steps, based on the outputs of the step of comparing the ratio and an output of the step of determining a maximum value, in a multiplexer; and
   adding the output generated by the outputting step to an accumulator.

* * * * *